June 21, 1932. G. O. CURRIE 1,864,484
POTATO DIGGING MACHINE
Filed Dec. 26, 1929 2 Sheets-Sheet 1
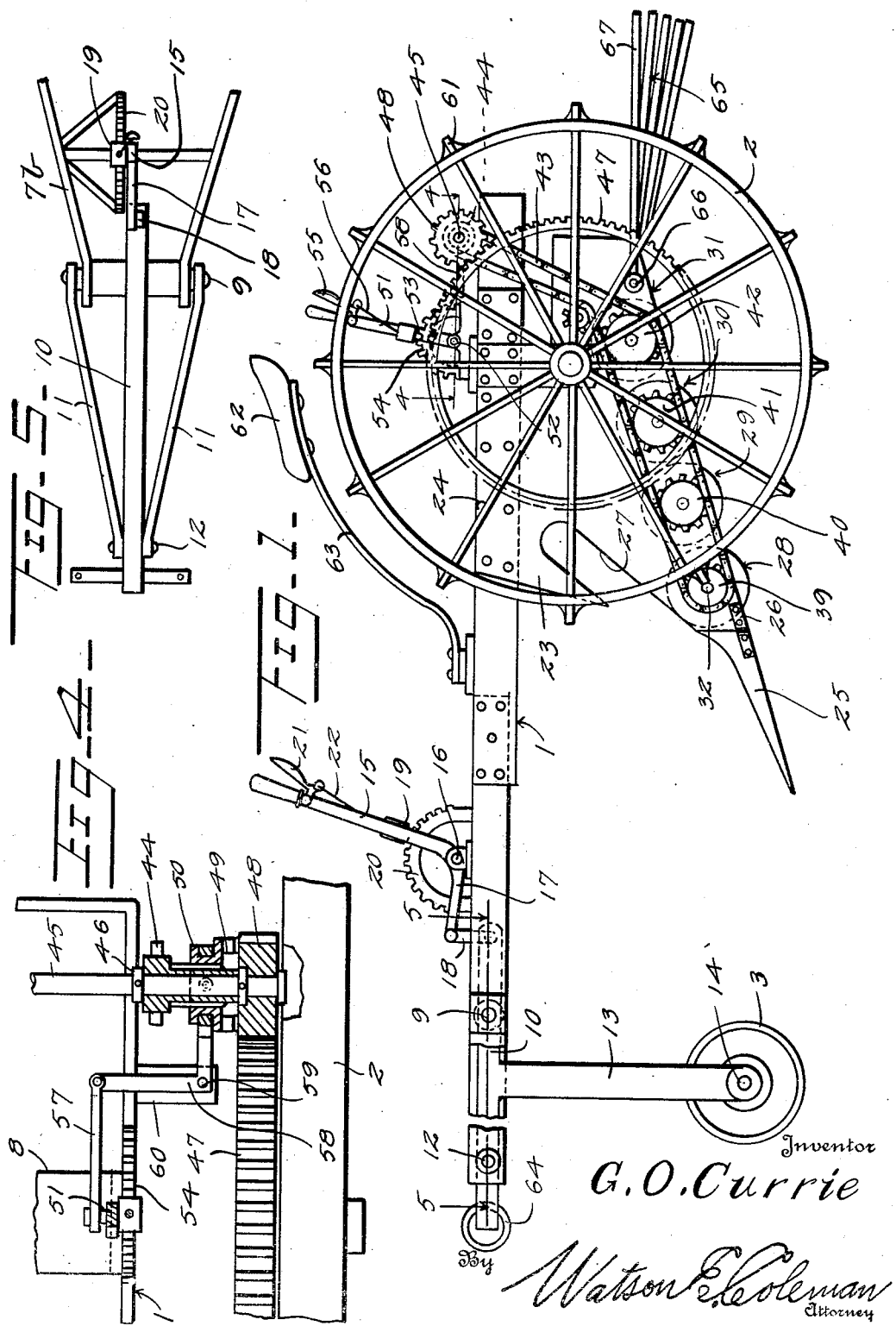
Inventor
G. O. Currie
By Watson E. Coleman
Attorney

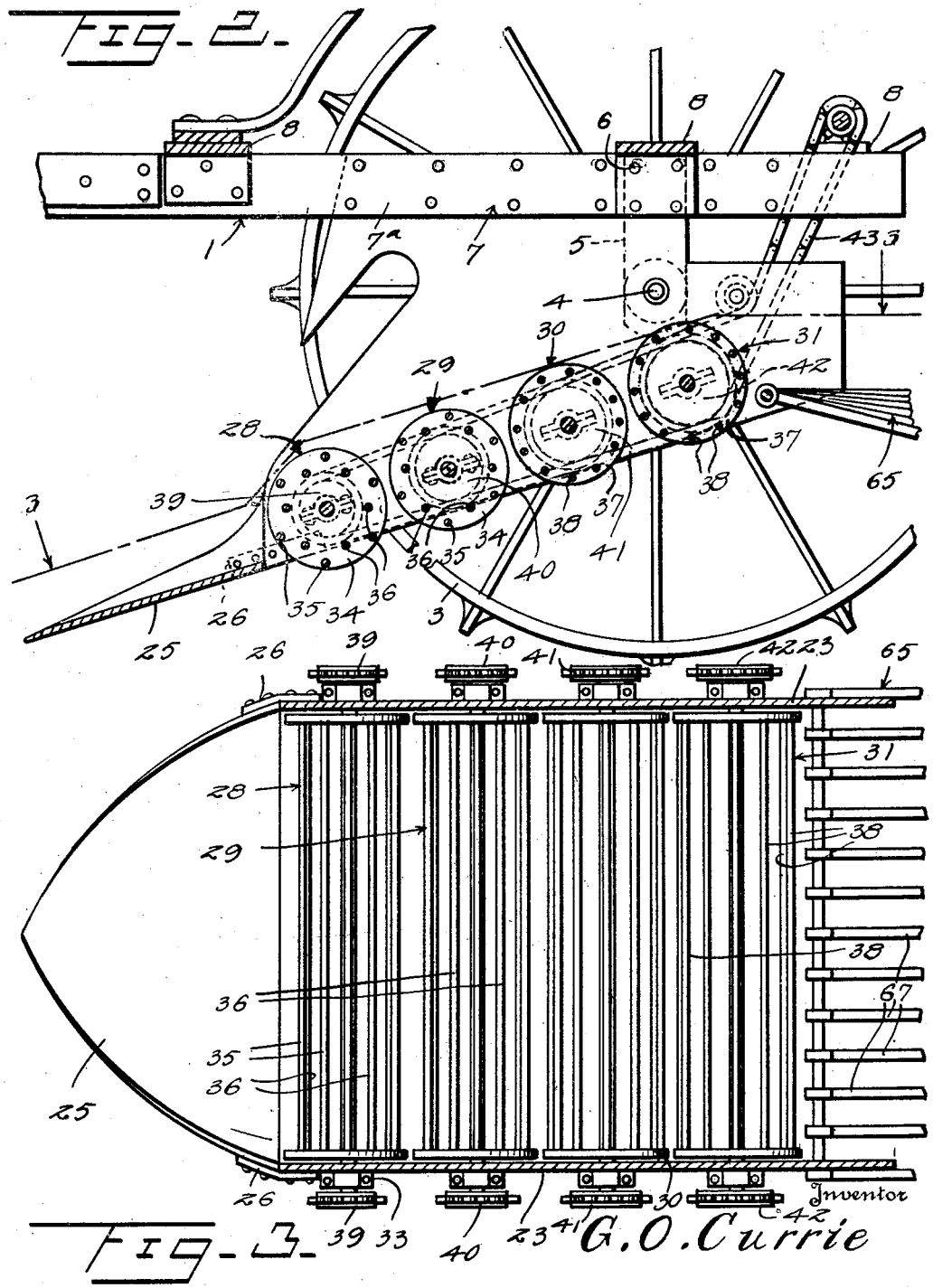

Patented June 21, 1932

1,864,484

UNITED STATES PATENT OFFICE

GEORGE O. CURRIE, OF SKOWHEGAN, MAINE; AUGUSTA C. CURRIE EXECUTRIX OF THE SAID GEORGE O. CURRIE, DECEASED

POTATO DIGGING MACHINE

Application filed December 26, 1929. Serial No. 416,575.

This invention relates to potato digging machines, and has for one of its objects to provide a novel, simple and highly efficient machine of this character which shall have such light draft as to permit it to be easily drawn over the field by a horse weighing not more than fourteen hundred pounds.

The invention has for a further object to provide a machine of the character stated which will not bruise or cover the potatoes and which will discharge the potatoes from its rear end in such manner as to arrange them in a row along its path over the field.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a view in side elevation of the potato digging machine;

Figure 2 is a sectional view on an enlarged scale taken on a vertical plane extending centrally and longitudinally through the rear portion of the machine;

Figure 3 is a sectional view taken on the planes indicated by the line 3—3 of Figure 2;

Figure 4 is a sectional view on an enlarged scale taken on the plane indicated by the line 4—4 of Figure 1, and Figure 5 is a sectional view on a reduced scale taken on the plane indicated by the line 5—5 of Figure 1.

The machine comprises a frame 1 which is supported by rear wheels 2 and front wheels 3. The axle 4 for the wheels 3 is journaled in the lower ends of bearing brackets 5 which are secured, as at 6, to and extend downwardly from the side bars 7 of the frame 1. The rear portions 7ª of the side bars 7 are arranged in parallel relation, and are connected by cross bars 8. The front portions 7ᵇ of the side bars 7 are arranged in forwardly converging relation, and a shaft 9 is journaled in the front ends thereof.

A lever 10 which is arranged at the longitudinal center of the frame 1 and extends forwardly and rearwardly beyond the front ends of the side bar portions 7ᵇ, is fixed near its rear end to the shaft 9. Braces 11, which are arranged at opposite sides of the lever 10, are connected at their rear ends to the shaft 9, and have their front ends connected to the lever, as at 12. An arm 13, which is fixed to the lever 10 at a point forwardly beyond the shaft 9, extends downwardly from the lever and carries at its lower end an axle 14 for the wheels 3. A hand lever 15 is pivoted, as at 16, to the frame 1, at a point rearwardly of the rear end of the lever 10, and is provided at its lower end with a forwardly directed arm 17 which is connected to the rear end of the lever 10 by a link 18. The lever 15 and its connection with the lever 10 provide means through the medium of which the lever 10 may be rocked upwardly or downwardly on its shaft 9 so as to effect the upward or downward rocking of the frame 1 on the axle 4. The lever 15 is secured in its adjusted position by a latch 19 which is carried thereby and engages a notched sector 20 secured to the frame 1, and the lever is provided with a finger lever 21 which is connected to the latch by a link 22 and provides means by which the latch may be retracted to free the lever 15 for rocking movement when it is desired to alter the adjustment of the frame 1.

Plates 23 are secured, as at 24, to and extend downwardly from the side bars 7. A plow or digger point 25 which is slightly concave in cross section and has a rounded front edge, extends forwardly and downwardly from the lower front edge portions of the plates 23, and is secured, as at 26, to the plates. The plates 23 are provided in their front portions with slots 27 which extend upwardly and rearwardly from the rear edge of the plow 25 and are opened at their lower ends. Reels 28, 29, 30 and 31 are arranged between the plates 23, and are fixed to shafts 32 journaled in bearings 33 fixed to the plates. The reels 28—31 have a transverse arrangement with respect to the plow 25, and occupy a plane inclining upwardly and rearwardly from the plow. The foremost reels 28 and 29 are similar, and each comprises heads 34 and rods 35 and 36, the rods extending from one head to the other and terminally secured thereto. The rods 35 are arranged in an annular series near the peripheries of the heads 34. The rods 36 are arranged in an annular series inwardly of the rods 35, and each of the rods 36 is arranged centrally between a pair of the rods 35. The reels 30 and 31 are also similar, and each of these reels comprises heads 37 and rods 38, the rods being arranged in an annular series near the peripheries of the heads and arranged in closer relation than the rods 35 of the reels 28 and 29.

The reels 28, 29, 30 and 31 are provided with sprocket wheels 39, 40, 41 and 42, respectively, which are fixed to the shafts 32. The sprocket wheels 40 are larger than the sprocket wheels 39, the sprocket wheels 41 are larger than the sprocket wheels 40 and the sprocket wheels 42 are larger than the sprocket wheels 41, and are driven through the medium of sprocket chains 43. The sprocket wheels 39—42, owing to their different sizes, causes the reels 28—31 to be rotated at different rates of speed. The rate of rotation of the reel 29 is lower than that of the reel 28, the rate of rotation of the wheel 30 is lower than that of the wheel 29, and the rate of rotation of the wheel 31 is lower than that of the wheel 30.

The sprocket chains 43 pass about the sprocket wheels 39—42 and about sprocket wheels 44 fixed to a shaft 45. The shaft 45 is journaled in bearings 46 secured upon the rear end portion of the frame 1, and it is driven from one of the wheels 2 through the medium of a gear 47 fixed to the wheel and a pinion 48 fixed on the shaft and meshing with the gear. The pinion 48 is loose on the shaft 45, and is provided with a clutch member 49 with which cooperates a clutch member 50 splined to the shaft. The clutch member 50 is adapted to be moved into and out of engagement with the clutch member 49 through the medium of a hand lever 51 which is pivoted, as at 52, to the frame 1. The lever 51 is provided with a latch 53 which cooperates with a notched sector 54 secured to the frame 1. The lever 51 is also provided with a finger lever 55 which is connected to the latch 53 by a link 56 so as to permit the latch to be withdrawn from engagement with the sector 54. The lever 51 is connected by a link 57 to one arm of an elbow lever 58. The lever 58 is pivoted, as at 59, upon a bracket 60 secured to the frame 1, and the other arm thereof is connected to the clutch member 50.

In order to insure the positive driving of the shaft 45 when the pinion 48 is clutched thereto, the wheels 2 are provided with cleats 61. A seat 62 is secured by a support 63 to the frame 1 at a point above the reels 28—31 and between the hand levers 15 and 51. The machine is adapted to be drawn by a horse of not more than fourteen hundred pounds, and to permit it to be hitched to the machine a clevis 64 is secured to the front ends of the braces 11. A hopper or depositer 65 extends rearwardly from the reel 31, and is secured at its rear end, as at 66, to and between the plates 23. The hopper or receiver 65 is of arcuate formation in cross section and arranged with its concave side uppermost, and its rear end curves downwardly and forwardly from its upper edge to its longitudinal center, the hopper being made preferably of a series of rods 67.

When the machine is in use, the plow 25 passes under the hill of potatoes, and the potatoes pass upwardly thereon into engagement with the reel 28. The reel 28 delivers the potatoes to the reel 29, the reel 29 delivers the potatoes to the reel 30, and the reel 30 delivers the potatoes to the reel 31. The potatoes pass from the reel 31 on to the hopper 65 and are delivered by the hopper on to the ground in a row. Due to the construction of the reels 28 and 29 and that of the reels 30 and 31, and as the reels are rotated at different rates of speed, the potatoes are delivered to the hopper 65 substantially free of all earth and without being bruised. Any long stalks will pass into the stem receiving slots 27 in the plates 23, and will be withdrawn from the slots and deposited on the field at the sides of the machine by the wheels 2 which are arranged close to the plates 23.

The plow 25 may be supported above the field or supported for penetrating the hill at the required depth through the medium of the lever 15 and the means by which it is connected to the front wheels 3.

While I have described the principle of the invention, together with the structure which I now consider the preferred embodiment thereof, it is to be understood that the structure shown is merely illustrative and that such changes may be made, when desired, as fall within the scope of the invention as claimed.

I claim:—

1. A potato digging machine, comprising a wheel supported frame, a plow carried by the frame in an upwardly and rearwardly inclined position, a series of reels journaled on the frame and extending upwardly and rearwardly from the plow, and means for rotating the reels at different speeds, the speeds of the respective reels decreasing consecutively in a rearward direction beginning with the forward reel.

2. A potato digging machine, comprising a wheel supported frame, a plow carried by the frame in an upwardly and rearwardly inclined position, a series of reels journaled on the frame and extending upwardly and rearwardly from the plow, the first two reels each having an outer annular series of spaced bars and an inner annular series of spaced bars arranged between the outer bars, the remaining reels each having an annular series of bars spaced apart for a distance less than the distance between the outer bars of said first two reels, and means for rotating the reels at consecutively decreasing speeds in a rearward direction.

3. A potato digging machine, comprising a wheel supported frame, a plow carried by the frame in an upwardly and rearwardly inclined position, a series of reels journaled on the frame and extending upwardly and rearwardly from the plow the first two reels each having an outer annular series of spaced bars and an inner annular series of spaced bars arranged between the outer bars, the remaining reels each having an annular series of bars spaced apart for a distance less than the distance between the outer bars of said first two reels, and means for rotating the reels at different speeds, the speeds of the respective wheels decreasing consecutively in a rearward direction.

4. A potato digging machine, comprising a wheel supported frame, plates extending downwardly from the sides of the frame, a plow secured to the front edges of the plates in an upwardly and rearwardly inclined position, a series of reels arranged between and journaled in the plates and extending upwardly and rearwardly from the plow means for rotating the reels at speeds decreasing consecutively in a rearward direction, and a receiver arranged between and secured to the plates and extending rearwardly from the uppermost reel.

5. A potato digging machine, comprising a frame, rear wheels journaled on the frame, a lever pivotally mounted between its ends in the front end of the frame, an arm extending downwardly from the lever, front wheels journaled on the arm, means for adjusting the lever and securing it in adjusted position, a plow carried by the frame in an upwardly and rearwardly inclined position, a series of reels journaled on the frame and extending upwardly and rearwardly from the plow, and means for rotating each succeeding reel at a speed reduced from the preceding reel.

6. A potato digging machine, comprising a frame, rear wheels journaled on the frame, a lever extending longitudinally of the frame and pivoted between its ends to the front end of the frame, an arm extending downwardly from the lever, front wheels journaled on the arm, means carried by the frame and connected to the rear end of the lever to permit the lever to be adjusted and secured in adjusted position, braces extending from the front end of the frame to the front end of the lever, a plow carried by the frame in an upwardly inclined position, a series of reels journaled on the frame and extending upwardly and rearwardly from the plow, and means for rotating each succeeding reel at a speed reduced from the preceding reel.

7. A potato digging machine, comprising a wheel supported frame, plates extending downwardly from the sides of the frame, a plow secured to the front edges of the plates in an upwardly and rearwardly inclined position, a series of reels journaled in and arranged between the plates and extending upwardly and rearwardly from the plows, the plates being provided with stem receiving slots extending upwardly and rearwardly from the plow and having their lower ends open, certain of said wheels being arranged close to the plates to permit them to withdraw the stems from the slots, and means for rotating the reels.

In testimony whereof I hereunto affix my signature.

GEORGE O. CURRIE.